(12) United States Patent
Han et al.

(10) Patent No.: US 8,865,636 B2
(45) Date of Patent: Oct. 21, 2014

(54) PAINT STRIPPING COMPOSITIONS

(71) Applicant: United States of America as represented by the Secretary of the Navy, Patuxent River, MD (US)

(72) Inventors: Young Han, Kathleen, GA (US); Dane Hanson, California, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 177 days.

(21) Appl. No.: 13/744,960

(22) Filed: Jan. 18, 2013

(65) Prior Publication Data

US 2014/0206590 A1 Jul. 24, 2014

(51) Int. Cl.
| | | |
|---|---|---|
| *C11D 1/22* | (2006.01) | |
| *C11D 3/43* | (2006.01) | |
| *C11D 3/44* | (2006.01) | |
| *B08B 3/04* | (2006.01) | |
| *C09D 9/04* | (2006.01) | |
| *C11D 3/20* | (2006.01) | |
| *C11D 3/18* | (2006.01) | |
| *C11D 3/24* | (2006.01) | |

(52) U.S. Cl.
CPC .............. *C09D 9/04* (2013.01); *C11D 3/2068* (2013.01); *C11D 3/185* (2013.01); *C11D 3/201* (2013.01); *C11D 3/181* (2013.01); *C11D 3/24* (2013.01); *C11D 3/2034* (2013.01); *C11D 1/22* (2013.01); *B08B 3/04* (2013.01)
USPC ........... 510/205; 510/201; 510/202; 510/203; 510/207; 510/210; 510/213; 510/426; 510/505; 510/506; 134/38

(58) Field of Classification Search
CPC .......... C11D 1/22; C11D 3/181; C11D 3/185; C11D 3/201; C11D 3/2068; C11D 3/2034; C11D 3/24; B08B 3/04
USPC ......... 510/201, 202, 203, 205, 207, 210, 213, 510/505, 506; 134/38
See application file for complete search history.

(56) References Cited

U.S. PATENT DOCUMENTS

| | | |
|---|---|---|
| 3,355,385 A | 11/1967 | Mackley |
| 5,215,675 A | 6/1993 | Wilkins |
| 5,425,893 A | 6/1995 | Stevens |
| 5,911,838 A | 6/1999 | Barnett |
| 2002/0144718 A1 | 10/2002 | Wilson |
| 2003/0083220 A1* | 5/2003 | Doyel et al. .................. 510/412 |
| 2003/0228997 A1* | 12/2003 | Doyel et al. .................. 510/410 |

* cited by examiner

*Primary Examiner* — Gregory R DelCotto
(74) *Attorney, Agent, or Firm* — Mark O. Glut; NAWCAD

(57) ABSTRACT

An environmental safety paint stripping composition comprising dichloroethylene, aromatic alcohols and ethers, surfactants, corrosion inhibitors, thickeners, wax solvents and water. This paint stripping composition is particularly useful in stripping paint and other polymeric coatings from metal substrates such as aluminum and it alloys.

18 Claims, No Drawings

PAINT STRIPPING COMPOSITIONS

STATEMENT OF GOVERNMENT INTEREST

The invention described herein may be manufactured and used by or for the Government of the United States of America for government purposes without the payment of any royalties thereon or therefore.

PAINT STRIPPING COMPOSITIONS HELD OF INVENTION

The present invention relates to a method and compositions for stripping paint and organic coatings from various substrates and particularly metal substrates such as aluminum and its alloy.

BACKGROUND OF THE INVENTION

Stripping compositions containing strong chemical agents; which are corrosive to the eyes, the skin, the respiratory tract, and some metals, for example, phenol, in combination with methylene chloride are presently in use for stripping paint from commercial and military aircraft. These compositions cause the paint to swell and loosen from the substrate. The common paint stripper activators used (in particular, phenol) are highly toxic, caustic, and/or deleterious.

More specifically, paint strippers typically contain solvents, co-solvents, activators, evaporation retardants, thickeners, wetting agents, emulsifiers, and corrosion inhibitors. The most important role of a solvent in a paint stripper is its diffusivity, which was found through the paint stripping mechanism study performed under the Strategic Environmental Research and Development Program (SERDP) Project Number WP-1682. Other roles of solvents include swelling target paints and delivering activators to the interfaces of paints and substrates. Co-solvents are commonly used to increase swelling of the target paint. Activators are believed to break or weaken the bonds between paints and substrates as well as chemical and physical bonds in polymers. Common activators used in paint stripper formulations are phenol, acids, bases, peroxides, and water. Phenol is a solid at ambient temperature and slightly acidic in aqueous solution. Even though phenol is acidic, no evidence of its corrosiveness on metal substrates has been reported. The SERDP study also found that phenol acts as a co-solvent; phenol is probably the most effective co-solvent. Paint strippers formulated with acid and base activators are rarely accepted in the aerospace industry due to their corrosiveness to metal substrates. The products formulated with hydrogen peroxide have been reported to cause hydrogen embrittlement to certain metal parts. Other components are used in paint stripping formulations for the purposes that their names imply.

Methylene chloride based paint strippers provide superior performance; however, paint strippers that contain methylene chloride and phenol are regulated under various EPA and OSHA regulations. Environmental, Safety and Occupational Health (ESOH) compliant paint strippers, have been developed, marketed, and used, but these products have been found to have substantially lower striping rates as compared to methylene chloride based paint strippers. The poor performance of these paint strippers cause longer process time and high volatile organic compounds (VOCs) emission, which in turn substantially increases the maintenance cost especially in the aerospace industry.

Accordingly, there exists a need for high performance paint strippers, the performance of which could match that of methylene chloride based paint strippers. Such paint strippers would be formulated using chemicals that are safe for humans and the environment with no corrosive activators.

It is therefore an object of this invention to provide paint stripping compositions which provide superior performance but do not contain methylene chloride. It is another object of this invention to provide paint stripping compositions that are high in performance and compliant to the various EPA and OSHA regulations.

It is another object of this invention to provide a method and a chemical composition that does not contain phenol or methylene chloride and exhibits high performance in stripping paint from the substrate.

SUMMARY OF THE INVENTION

The present invention relates to high performance paint strippers. More specifically, the invention pertains to paint strippers, the performance of which match that of methylene chloride paint strippers and that are formulated using chemicals safe for humans and the environment. The present compositions can be used to remove adhesives, sealants, and other organic coatings such as enamel, varnish or lacquer. Generally, the compositions are in contact with the surface for a period of time sufficient to produce a blistering of the polymeric coating, after which time, the blistered coating can be removed with an abrasive material. Alternatively, the coating can be removed by lifting the blistered coating off of the surface by spraying the blistered coating with water.

The paint stripping compositions of this invention consist essentially of dichloroethylene, aromatic alcohols, aromatic ethers, aliphatic alcohols, surfactants, corrosion inhibitors, wax, thickeners, organic solvents and water.

DETAILED DESCRIPTION

This invention is directed to compositions and the method of using said compositions for removing or stripping paint and other organic coatings from various substrates and particularly metal substrates such as aluminum and aluminum alloys. The stripping composition consist essentially of dichloroethylene (1,1-dichloroethylene, cis-1,2-dichloroethylene, trans-1,2-dichloroethylene, or mixtures thereof) in parts by weight, ranging from about 55 to 65 parts preferably 60 to 62 parts, and from about 10 to 20 parts preferably 12 to 18 parts of an aromatic compound selected from the group consisting of aromatic alcohols and aromatic ethers such as diphenyl ether and benzyl alcohol, from about 1.0 to 10 parts preferable 4 to 6 parts of an aliphatic alcohol having 2 to 4 carbons, from about 1.0 to 10 or preferably 4.0 to 6.0 parts of surfactant, from about 0.0 to 10 preferably 4.0 to 6.0 parts of corrosion inhibitors, from about 1.0 to 5.0 preferably 1.0 to 2.0 parts of a wax, from about 1.0 to 5.0 parts preferably 1.0 to 2.0 parts of a thickener, from about 1.0 to 10 parts preferably 1.0 to 5.0 parts of an organic solvent and from about 1.0 to 20 parts preferably 5.0 to 10 parts of water.

A major objective of the present invention is to identify dichloroethylene as the solvent that diffuses as fast as methylene chloride and helps deliver other components of the composition into target paints in order to effectively remove the paints. Another objective is to identify chemical components that are safe for humans and the environment and therefore useful in the paint stripper formulations.

1,2-trichloroethylene (cis, tran, or mixture) was identified as the one solvent to replace methylene chloride. The current Occupational Safety and Health Administration (OSHA) permissible exposure limit (PEL) for 1,2-dichloroethylene is 200 ppm as an 8-hour time-weighted average (TWA) concentration. As compared, the current OSHA PEL for methylene chloride is 25 ppm as an 8-hour TWA. Methylene chloride is listed also as a Hazardous Aft Pollutant (HAP), but 1,2-dichloroethylene is not.

Paint strippers formulated with methylene chloride and with various other components are available on the market and found effective. As is the case for methylene chloride based paint strippers, 1,2-dichloroethylene also can be formulated with various other chemical components, however the 1,2-dichloroethylene based paint stripper formulations are more effective and are better than others for a specific paint stripping application.

Some paints such as aircraft coatings are designed to withstand harsh environmental conditions. For those coatings a solvent alone does not provide sufficient swelling of the coating to remove the coatings from the substrate. Co-solvent and/or activators are added to increase the stripping rate of the final product. Many of co-solvents and/or activators are toxic or environmentally unfavorable chemicals. Alcohols and ethers, generally known as environmentally friendly and non-toxic, are found to be effective co-solvents without the need for additional activators for the 1,2-dichloroethylene paint stripper formulations. It is noted also that the co-solvents used in the example formulations, benzyl alcohol and diphenyl ether, are non-HAP. The present invention is better understood by the examples that follow. The examples are intended for illustrative purpose only, and are not meant to limit the scope of the invention.

EXAMPLES

High performance paint strippers were prepared in accordance with the present invention. Its formulations are provided in Tables 1 and 2.

TABLE 1

| Sample Formulation | |
|---|---|
| Component | Parts by Weight |
| 1,2-dichloroethylene | 60.2 |
| Benzyl alcohol | 15.7 |
| Water | 1.7 |
| Ethanol | 5.8 |
| Surfactant/corrosion inhibitor | 5.4 |
| Hydro-treated heavy naphtha | 2.0 |
| Paraffin wax | 1.9 |
| Thickener | 1.3 |

Formulation A shown in Table 1 was found to be effective in removing the Navy Aircraft coating (polyurethane topcoat/epoxy primer) on 2024 aluminum alloy test panels. Less than 5 minutes from the time Formulation A was applied to the coated panel, the coating was lifted. Subsequent scraping with a plastic spatula completely removed the coating from the substrate. In comparison, a typical benzyl alcohol based paint stripper takes more than two hours to completely remove the coating identically prepared.

TABLE 2

| Sample Formulation B | |
|---|---|
| Component | Parts by weight |
| 1,2-dichloroethylene | 60.6 |
| Di-phenyl ether | 15.8 |
| Water | 7.8 |
| Ethanol | 5.8 |
| Surfactant/corrosion inhibitor | 5.5 |
| Toluene | 1.3 |
| Paraffin wax | 1.9 |
| Thickener | 1.3 |

Formulation B shown in Table 2 was also found to be effective in removing the Navy aircraft coating. The coating was completely lifted in less than 45 minutes with Formulation B, which is slower than Formulation A, but faster than a benzyl alcohol based paint stripper. 1,2-Dichloroethylene is safer than methylene chloride for humans and the environment. Therefore, paint strippers formulated with 1,2-dichloroethylene based paint stripper formulated with alcohols as co-solvents and/or ethers perform as effectively as methylene chloride based paint strippers formulated with phenol. A multitude of paint stripper formulations using 1,2-dichloroethylene are possible. It is possible also that various formulations using the same components with different mixing ratios could provide the same or enhanced paint stripping efficiencies. The same formulations can be used to remove adhesives, sealants, and other organic coatings such as enamel, varnish or lacquer.

Aromatic alcohols and aromatic ethers that can be used in the formulas illustrated in Tables I and II include, for example, diphenoxybenzene, propoxybenzene, methoxybenzene, ethoxybenzene, benzyl ether, diphenyl ether, cyclopentanol, naphthalenol, phenylcarbinal, tolyl alcohol, mellityl alcohol, and other aromatic alcohols that contain a hydroxyl group in a side chain of an aromatic ring.

Anionic, nonionic and catonic surfactants may be employed in the present compositions. It may be preferable to include a mixture of surfactants to enhance the solubility of certain components. A surfactant mixture may promote the stripping of the polymeric coating and enhance the removal of the stripped coating by washing.

The surfactants are added to the compositions in effective amounts ranging from about 1.0 to 10 parts by weight and preferably from 4.0 to 6.0 parts by weight. The surfactants are known to provide better wetting properties by lowering the surface tension thereby insuring complete coverage of the substrates. The surfactants include at least one compound selected from the group consisting of non-ionic, anionic, and cationic surfactants. Examples of the surfactants and corrosion inhibitors include monocarboxylimidoazoline, alkylsulfate sodium salts (DUPONOL®), salts of alkylbenzene sulfonates, ethoxylated or propoxylated alkylphenols (IGEPAL®), alkylsulfonamides, alkaryl sulfonates, palmiticalkanol amides (CENTROL®) the alkylarylpolyether alcohols such as octylphenylpolyethoxy ethanol or polyoxyethylene nonylphenyl ether, (TRITON®), sorbitan monopalmitate (SPAN®), dodecylphenyl polyethyleneglycol ether (TERGITOL®), alkyl pyrrolidones, polyalkoxylated fatty acid esters, lower alkylbenzene sulfonates, alkyl naphthalene sulfonates, and various mixtures of these surfactants; see surfactants in Kirk-Othmer's Encyclopedia of Chemical Technology, 3$^{rd}$ Ed.

In addition to the surfactants, additional corrosion inhibitors added to the compositions of this invention include compounds selected from the group consisting of benzimidazoles, benzazoles, benzoxazoles and mixtures of these corrosion inhibitors in any ratio. The corrosion inhibitors are added in effective amounts ranging from about 0.0 to 10 or 1.0 to 10 parts by weight and preferably in amounts ranging from about 4 to 6 parts by weight. Other inhibitors include triazoles containing up to 12 carbon atoms. The preferred aryl triazoles contain from 6-10 carbon atoms, including compounds such as benzotriazole and tolytriazole. The aryl triazoles are commercially available under the trade name "COBRATEC".

Paraffin wax was dissolved in a solvent prior to mixing with other components. Solvents that are substantially non-polar or oleophilic solvents can be used for this purpose. The preferred solvents include aromatic and alphatic hydrocarbons. Aromatic solvents include benzene, toluene, xylenes, and fractions from distillation of petroleum. Aliphatic hydrocarbon solvents include hexane, cyclohexane, heptanes, octanes, and similar straight and branched hydrocarbons and mixtures thereof. Included are the fractions from the distillation of petroleum mineral spirits and various mixtures of these solvents.

Where vertical surfaces are to be sprayed, thickening agents can be used to retain the composition on the coating surface for an extended time sufficient to loosen the coating. Example of thickeners include cellulose such as ethyl cellulose, ethyl hydroxyethyl cellulose, methyl cellulose, colloidal silica, days such as bentonite, starch colloidal alumina or gum arabic.

Compositions according to the present invention include an alcohol as a co-solvent, preferably a monohydroxy alcohol selected from the group consisting of ethanol, propanal, butanol, pentanol, hexanol and alcohols having up to 12 carbons.

The compositions of the present invention are generally applied to the surface to be stripped in the usual manner, i.e., the compositions are applied by brush, or other applicator and then applied to the surface to be stripped. Alternatively, the compositions may be sprayed onto a surface using spraying system, such system taking advantage of the thixotropic characteristics of the compositions on vertical panels.

While a preferred embodiment of the invention has been described, it will be apparent to those killed in the art that changes and modifications may be made without departing from the invention. The appended claims are therefore intended to cover changes and modifications that fail within the scope of the claimed invention.

The invention claimed:

1. Composition for stripping paint from a substrate consisting essentially of, in parts by weight, from about 55 to 65 parts of dichloroethylene, 10 to 20 parts of an aromatic compound selected from the group consisting of aromatic alcohols and aromatic ethers, 1.0 to 10 parts of an aliphatic alcohol having from 2 to 4 carbon atoms, 1.0 to 10 parts of surfactant, 0.0 to 10 parts of corrosion inhibitor, 1.0 to 5.0 parts of wax, 1.0 to 5.0 parts of thickener, 1.0 to 20 parts of water, and 1.0 to 10 parts of an organic solvent.

2. The composition of claim 1 wherein the aromatic alcohol is benzyl alcohol.

3. The composition of claim 2 wherein the aromatic ether is diphenyl ether.

4. The composition of claim 3 wherein the aliphatic alcohol is ethanol.

5. The composition of claim 4 wherein the surfactant is an alkyl aryl sulfonate.

6. The composition of claim 5 wherein the wax is paraffin wax.

7. Composition for stripping paint from a substrate consisting essentially of, in parts by weight, from about 60 to 62 parts of 1,2,dichloroethylene, 12 to 18 parts of an aromatic compound selected from the group consisting of an aromatic alcohol and an aromatic ether, 4 to 6 parts of an aliphatic alcohol having 2 to 4 carbon atoms, 4.0 to 6.0 parts of a surfactant, 4.0 to 6.0 parts of a corrosion inhibitor, 1.0 to 2.0 parts of a paraffin wax, 1.0 to 2.0 parts of a thickener, 5.0 to 10 parts of water, and 1.0 to 5.0 parts of an organic solvent.

8. The composition of claim 7 wherein the substrate is metal.

9. The composition of claim 8 wherein the aromatic ether is diphenyl ether.

10. The composition of claim 9 wherein the aromatic alcohol is benzyl alcohol.

11. The composition of claim 10 wherein the surfactant is an alkyl aryl sulfonate.

12. The composition of claim 11 wherein the solvent is naphtha.

13. The process for removing paint from a substrate which comprises coating the painted substrates with an effective amount of a composition comprising, in parts by weight, from about 55 to 65 parts of dichloroethylene, 10 to 20 parts of an aromatic compound selected from the group consisting of an aromatic alcohol and an aromatic ether, 1.0 to 10 parts of an aliphatic alcohol having from 2 to 4 carbon atoms, 1.0 to 10 parts of a surfactant, 0.0 to 10 parts of a corrosion inhibitor, 1.0 to 5.0 parts of a paraffin wax, 1.0 to 5.0 parts of a thickener, 1.0 to 20 parts of water, and 1.0 to 10 parts of an organic solvent.

14. The process of claim 13 wherein the aromatic alcohol is benzyl alcohol and the aromatic ether is diphenyl ether.

15. The process of claim 14 wherein the aliphatic alcohol is ethanol.

16. The process of claim 15 wherein the corrosion inhibitor ranges from 1.0 to 10 parts of a triazole.

17. The process of claim 16 wherein the organic solvent is toluene.

18. The process of claim 17 wherein the thickener is cellulose and the surfactant is an alkyl aryl sulfonate.

* * * * *